United States Patent Office 3,437,678
Patented Apr. 8, 1969

3,437,678
**N-(DIBUTYLSTANNYLENE)CHLOROTOLUENE-
SULFONAMIDES**
John J. Barch, Crestwood, and Pasquale P. Minieri, Woodside, N.Y., assignors to Tenneco Chemicals, Inc., a corporation of Delaware
No Drawing. Filed Oct. 14, 1966, Ser. No. 586,673
Int. Cl. C07f 9/22; A01n 9/16
U.S. Cl. 260—429.7        3 Claims This invention relates to fungicidal compositions and to a method of controlling the growth of fungi. More particularly, it relates to fungicidal compositions that are suitable for use on living plant materials intended for human or animal consumption and to a method of controlling the growth of fungi on the plant materials through the use of these compositions.

In accordance with this invention, it has been found that certain organotin compounds are highly effective against a wide variety of plant pathogens, such as those responsible for early blight and late blight of tomatoes, powdery mildew of beans, and other serious crop diseases. These compounds are stable and resistant to weathering and at the concentration levels necessary to control the growth of fungi are substantially nontoxic both to living plants and to mammals that consume the plant materials.

The organotin compounds that can be used as the primary fungicidally-active components of the compositions of this invention are N-(dialkyl or diaryl-stannylene)chlorotoluenesulfonamides that may be represented by the structural formula

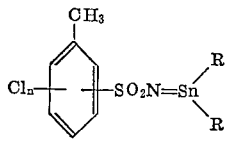

wherein each R represents a member selected from the group consisting of alkyl groups having from 1 to 12 carbon atoms, phenyl, chlorophenyl, and alkylphenyl and $n$ represents an integer, in the range of 1 to 4. The preferred compounds for use as agricultural fungicides are those represented by the structural formula

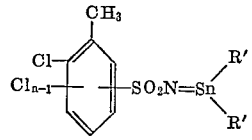

wherein $n$ has the aforementioned significance and each R' represents an alkyl group having 4 to 8 carbon atoms. The preferred group of compounds includes, for example, N-(dibutylstannylene) - o - chlorotoluenesulfonamide, N-(dibutylstannylene) - 2,6 - dichlorotoluenesulfonamide, N-(dibutylstannylene)-2,3,6-trichlorotoluenesulfonamide, N-(dibutylstannylene) - 2,3,5,6 - tetrachlorotoluenesulfonamide, N - (dihexylstannylene)-2,6-dichlorotoluenesulfonamide, N - (dihexylstannylene)-2,3,5,6-tetrachlorotoluenesulfonamide, N-(dioctylstannylene) - o - chlorotoluenesulfonamide, N - (dioctylstannylene)-2,3,6-trichlorotoluenesulfonamide, N-(butyl-N-octylstannylene)-2,3,6-trichlorotoluenesulfonamide, and the like. A single N-(dialkyl [or diaryl] stannylene)chlorotoluenesulfonamide or a mixture of two or more of these compounds may be present in the fungicidal compositions of this invention. Because they can be readily and economically prepared and because they provide excellent control of fungi with little or no damage to crop plants, mixtures of isomeric N-(dialkyl [or diaryl] stannylene)chlorotoluenesulfonamides that contain a major amount of isomers having a chlorine atom in at least one of the aromatic ring positions ortho to the methyl group may be used in the fungicidal compositions of this invention.

The organotin compounds of this invention may be prepared by any suitable and convenient procedure. For example, the appropriate chlorotoluene may be reacted with a stoichiometric excess of chlorosulfonic acid to form a chlorotoluenesulfonyl chloride, which is then converted by treatment with ammonium hydroxide to the corresponding chlorotoluenesulfonamide. This compound may then be condensed with a dialkyl tin oxide or diaryl tin oxide to form a N-(dialkyl or diaryl-stannylene)chlorotoluenesulfonamide.

Various techniques can be employed for treating crop plants with the fungicidal compositions of this invention. For example, the parts of the plants above or in the soil or the plant seeds may be contacted with the fungicidal compound. Alternatively, the fungicide may be introduced into the soil near the roots of the plants. The fungicidal compounds may also be introduced directly into the plants through holes or incisions in them.

While the fungicidal compounds may be applied as such to plants, to seeds, or to the soil, they are ordinarily and preferably combined with an inert fungicidal adjuvant carrier and applied as sprays or as dusts. They are generally applied by spraying the plants, the seeds, or the soil with an aqueous suspension or emulsion of the active compound. Aqueous suspensions or emulsions containing about 0.001 percent to 1 percent by weight, and in most cases 0.01 percent to 0.5 percent by weight, of the active agent are particularly suitable for this use. These sprays usually also contain about 0.01 percent to about 0.05 percent by weight of a wetting agent, such as an alkyl sulfate, an alkyl aryl sulfonate, a sulfosuccinate, a polyethylene glycol ether, and the like.

Alternatively, the fungicidal compounds may be dissolved in inert organic solvents, such as acetone, naphtha, or ethylene dichloride, and applied as solutions, or they may be mixed with or deposited upon such inert finely divided solid carriers as calcium phosphate, chalk, bentonite, kaolin, talc, and the like, and applied as dusts.

The novel organotin compounds of this invention may be used as the sole active component of the fungicidal compositions. If desired, however, the compositions may also contain other fungicides, such as sulfur, the metal dimethyldithiocarbamates, and the metal ethylenebis(dithiocarbamates); insecticides such as chlordane, benzene hexachloride, and DDT; or plant nutrients such as urea, ammonium nitrate, and potash.

The invention is further illustrated by the examples that follow.

EXAMPLE 1

A mixture of 250 ml. of xylene, 27.5 grams (0.1 mole) of a mixture of trichlorotoluenesulfonamides that contained about 65% of 2,3,6 - trichlorotoluenesulfonamide, and 24.8 grams (0.1 mole) of dibutyl tin oxide was heated at its reflux temperature for five hours in a reaction flask equipped with a Dean-Stark water trap. At the end of this time, the reaction mixture was a homogeneous solution, and almost the theoretical amount of water had been collected. The mixture was heated under reduced pressure to remove the xylene and then heated under vacuum at 80° C. for 18 hours. There was obtained 48.8 grams (96% yield) of N - (dibutylstannylene)trichlorotoluenesulfonamide that contained about 65% of the 2,3,6-trichloro isomer. This product, which melted at 212°–16° C., contained 34.84% C, 4.37% H, 21.03% Cl, 2.48% N, and 6.37% S (calculated for $C_{15}H_{25}NO_2Cl_3SSn$, 35.6% C, 4.35% H, 20.9% Cl, 2.75% N, and 6.28% S).

EXAMPLE 2

The procedure described in Example 1 was repeated using o-chlorotoluene-5-sulfonamide in place of trichlorotoluenesulfonamide. There was obtained an 85% yield of N-(dibutylstannylene)-o-chlorotoluene-5-sulfonamide, which contained 40.31% C, 5.70% H, 8.0% Cl, 3.06% N, and 7.03% S (calculated for $C_{15}H_{27}NO_2ClSSn$, 41.3% C, 5.5% H, 8.1% Cl, 3.2% N, and 7.3% S).

EXAMPLE 3

Samples (100 mg.) of the products of Examples 1 and 2 were dissolved in 10 ml. portions of acetone that contained 2000 p.p.m. of sorbitan trioleate (Span 85) and 5000 p.p.m. of a polyoxyethylene ether of sorbitan monooleate (Tween 80). The acetone solutions were dispersed in 90 ml. portions of distilled water to form suspensions containing 1000 p.p.m. of the organotin compounds. More dilute suspensions were prepared by adding distilled water to these suspensions.

EXAMPLE 4

Series of experiments were carried out in which tomato plants which had been sprayed with aqueous suspensions of the products of Examples 1 and 2 were sprayed with a suspension of spores of the fungus that causes early and late blight of tomatoes. One week after treatment the degree of suppression of the disease was noted. The following results were obtained.

| Fungicide | Concentration of fungicide in aqueous suspension (p.p.m.) | Percent control of early blight of tomato | Percent control of late blight of tomato | Phytotoxicity |
|---|---|---|---|---|
| N-(dibutylstannylene)-trichlorotoluenesulfonamide. | 1,000 | 100 | 100 | None. |
|  | 500 | 100 | 100 | Do. |
|  | 100 | 98 | 100 | Do. |
|  | 20 | 96 | 98 | Do. |
|  | 4 | 92 | 88 | Do. |
|  | 1 | 66 | ---------- | Do. |
| N-(dibutylstannylene)-o-chlorotoluenesulfonamide. | 1,000 | 100 | ---------- | Do. |
|  | 500 | 100 | ---------- | Do. |
|  | 100 | 91 | ---------- | Do. |
|  | 20 | 57 | ---------- | Do. |

EXAMPLE 5

To determine its effectiveness as a soil fungicide, N-(dibutylstannylene)-o-chlorotoluenesulfonamide was tested against four common soil fungi by the surface mycelial growth method at the rate of 300 pounds per acre. The following results were obtained.

|  | *Sclerotium rolfsii* | *Pythium* sp. | *Rhizoctonia solani* | *Fusarium oxysporum* f. *lycopersici* |
|---|---|---|---|---|
| Degree of growth of organism. | Few colonies. | Few colonies. | Few colonies. | No growth. |

Each of the other N-(dialkyl or diaryl-stannylene) chlorotoluenesulfonamides disclosed herein has also been found to be effective in inhibiting the growth of various plant pathogens without causing injury to the plants.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:
1. A compound having the structural formula

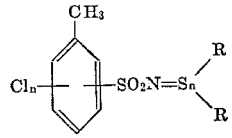

wherein each R represents a member selected from the group consisting of alkyl groups having from 1 to 12 carbon atoms, phenyl, chlorophenyl, and alkylphenyl and $n$ represents an integer in the range of 1 to 4.

2. The compound as set forth in claim 1 that has the structural formula

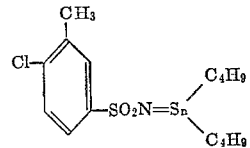

3. The compound as set forth in claim 1 that has the structural formula

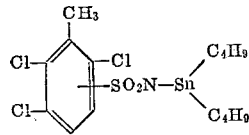

References Cited

UNITED STATES PATENTS 2,618,625  11/1952  Mack et al. _____ 260—429.7 X
2,634,281  4/1953  Mack et al. _____ 260—429.7

TOBIAS E. LEVOW, *Primary Examiner.*

W. F. W. BELLAMY, *Assistant Examiner.*

U.S. Cl. X.R.

424—288